(12) United States Patent
Fisher

(10) Patent No.: US 7,765,631 B2
(45) Date of Patent: Aug. 3, 2010

(54) POWER TOOL

(75) Inventor: Hugh Edward Fisher, Dalrymple (GB)

(73) Assignee: Wave Craft Limited, Dubai (AE)

( * ) Notice: Subject to any disclaimer, the term of this patent is extended or adjusted under 35 U.S.C. 154(b) by 779 days.

(21) Appl. No.: 10/204,239

(22) PCT Filed: Feb. 13, 2001

(86) PCT No.: PCT/GB01/00594

§ 371 (c)(1),
(2), (4) Date: Nov. 6, 2002

(87) PCT Pub. No.: WO01/60564

PCT Pub. Date: Aug. 23, 2001

(65) Prior Publication Data

US 2003/0106177 A1 Jun. 12, 2003

(30) Foreign Application Priority Data

Feb. 17, 2000 (GB) .................................. 0003708.5

(51) Int. Cl.
*A47L 13/02* (2006.01)
(52) U.S. Cl. .................. 15/93.1; 15/50.1; 15/236.01
(58) Field of Classification Search .................. 15/50.1, 15/49.1, 22.1, 236.01, 104.02, 93.1; 451/356, 451/357, 421; 30/182, 187–188
See application file for complete search history.

(56) References Cited

U.S. PATENT DOCUMENTS

| | | | | |
|---|---|---|---|---|
| 3,430,709 A * | 3/1969 | Miller | .......................... | 173/205 |
| 4,479,759 A * | 10/1984 | Zeitz | ........................... | 417/500 |
| 4,930,583 A * | 6/1990 | Fushiya et al. | .............. | 173/109 |
| 5,026,168 A * | 6/1991 | Berryman et al. | ........ | 366/171.1 |
| 5,042,592 A | 8/1991 | Fisher | ......................... | 173/109 |
| 5,427,188 A * | 6/1995 | Fisher | ......................... | 173/205 |
| 5,513,709 A | 5/1996 | Fisher | ......................... | 173/205 |
| 5,579,786 A * | 12/1996 | Wolk et al. | ................... | 132/322 |
| 5,611,404 A | 3/1997 | Biek et al. | ..................... | 173/1 |
| 5,736,711 A * | 4/1998 | Joos et al. | .................... | 219/132 |
| 5,850,977 A * | 12/1998 | Csendes | ...................... | 241/17 |
| 6,422,867 B2 * | 7/2002 | Lang et al. | .................. | 433/118 |
| 6,842,931 B2 * | 1/2005 | Porat et al. | .................... | 15/1.7 |

FOREIGN PATENT DOCUMENTS

| | | |
|---|---|---|
| DE | 4104015 | 8/1992 |
| GB | 2219958 A | 12/1989 |
| JP | 63283877 | 11/1988 |

* cited by examiner

*Primary Examiner*—Shay L Karls
(74) *Attorney, Agent, or Firm*—Gifford, Krass, Sprinkle, Anderson & Citkowski, P.C.

(57) ABSTRACT

A power tool (10) is provided having a plastic casing (12) and a scraper blade (14). The blade (14) is caused to reciprocate by an internal low power rotary motor (24) which drives a cylinder cam (28) having a sinusoidal cam track (34). A pair of studs (36) ride in the cam track (34), and drive the reciprocal movement of the blade (14). The tool (10) is substantially sealed against liquid ingress by means of an elastomeric membrane within the casing (12), and may be used as a marine growth remover, for defouling boats and the like.

31 Claims, 3 Drawing Sheets

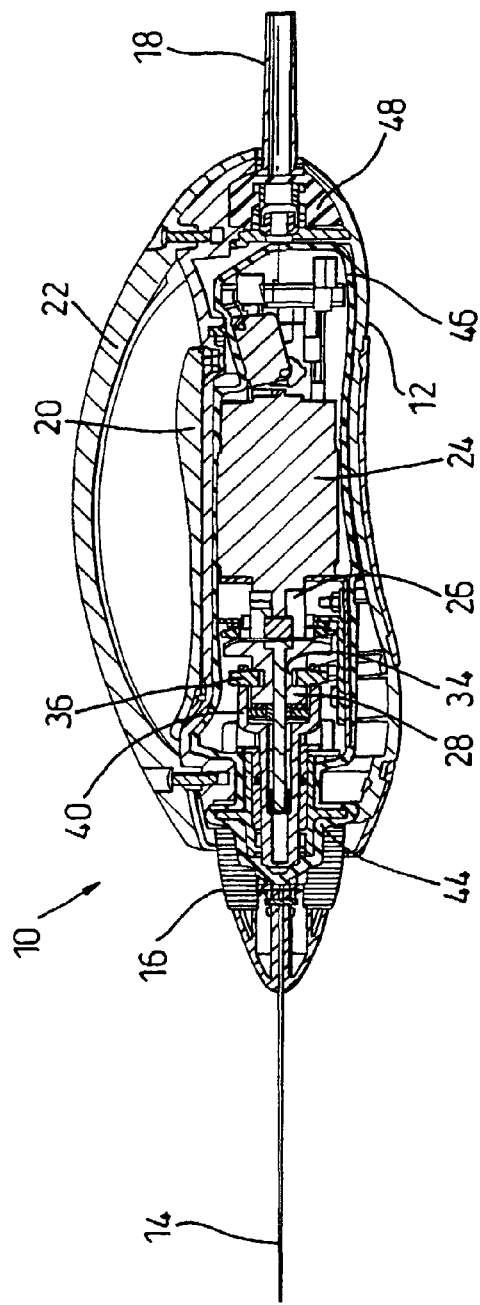
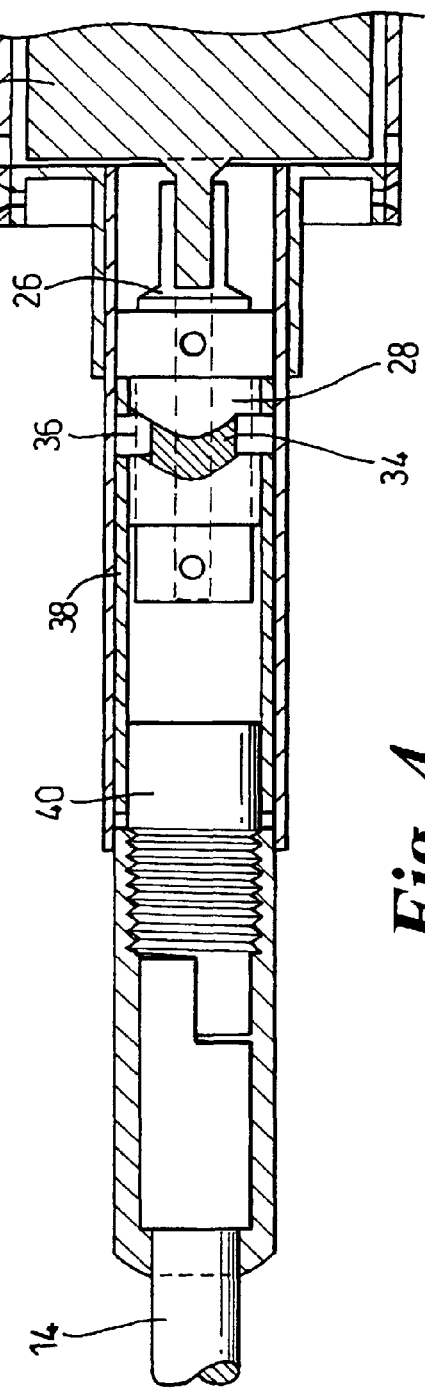
Fig. 3
Fig. 4

POWER TOOL

This application is a continuation of the National Stage of International Application No. of PCT/GB01/00594, filed Feb. 13, 2001.

The present invention relates to a power tool, and particularly but not exclusively to lightweight power tools suitable for use in damp, moist, wet or submerged environments; and more particularly but not exclusively to power tools for use as removers of marine growth (for example, barnacles) from vessels.

The growth of marine life on vessels is a significant problem to the operators/owners of such vessels. Not only does an encrustation of barnacles or mussels look unsightly, but such a growth may adversely affect the hydrodynamic properties of a vessel's hull.

A common means of deterring molluscan or crustacean growth on a vessel hull is to coat or otherwise treat the hull with anti-fouling agents such as specialised paints. However, such paints may contain chemicals which are harmful to other marine life; and even if this is not the case, such agents may not be used against already-existing encrustations. Therefore physical removal means must also be used.

It is known to make use of powered scraper tools, consisting of a reciprocating blade/scraper powered by a motor means. Commonly such tools are hydraulically or pneumatically powered; however, such power means necessitate the use of a noisy and bulky compressor or the like in conjunction with the tool itself, resulting in a limited range of utility of the tools. Similar electrically-powered devices are known for use in alternative roles on land; for example, wallpaper strippers and the like. However, these electrically powered devices obtain their power by plugging them into an ordinary wall socket, and the nature of the motor is such that the tool may run at no less than a few hundred watts. This relatively high power motor generates a substantial amount of heat which must be dissipated from the tool by means of air movements and slotted casings. The requirement that the motor be accessible to the environment therefore means that these electrically-driven tools are unsuitable for adaptation to a moist environment or underwater.

It is among the objects of embodiments of the present invention to obviate or alleviate these and other disadvantages of existing reciprocating power tools. This is achieved in part by the use of a low power reciprocating drive means as described in applicant's UK Patent No. 2219958, the content of which is incorporated herein by reference.

According to a first aspect of the present invention there is provided a portable power tool comprising a housing, a drive means and a mounting arrangement for a tool bit, wherein there is provided within the housing an output arrangement adapted to drive an output shaft in a reciprocal axial movement to drive the tool bit, wherein the drive means is substantially sealed from external of the tool.

By this arrangement the tool is substantially sealed against ingress of moisture or liquid, and may be used in wet or underwater conditions.

The tool bit may be a scraper.

The tool may be adapted for hand-held use.

The tool may comprise a marine growth removal tool, such as may be used upon the hull of a vessel such as a ship or boat or upon another marine structure.

The mounting arrangement may be adapted to provide for selection of one of a plurality of interchangeable tool bits.

Advantageously the drive means may be a linear output motor. Alternatively, in a preferred arrangement the drive means may be rotary motor requiring the intermediary of a device, which may be a cam device, to convert rotary motion into axially reciprocating motion.

Conveniently, therefore, there may be provided a cylinder cam mounted for rotation with the output shaft from the motor, said cam being provided with a substantially sinusoidal cam track extending around its circumferential surface, an output shaft adapted to partake of reciprocal axial movement to drive a selected tool bit, and cam follower means adapted to run in said cam track to impart said reciprocal axial motion to said output shaft.

Conveniently, the cylinder cam may be selected from a plurality of cam members having a range of cam throw distances.

Where necessary, intermediate gearing may be interposed between the motor and the output shaft.

According to a preferred embodiment of the present invention, there is provided a power tool comprising a housing, a drive means, and a mounting arrangement for a tool bit, wherein the drive means comprises a rotary motor and a cylinder cam mounted for rotation with the output arrangement from the motor, said cam being provided with a sinusoidal cam track extending around its circumferential surface, an output shaft adapted to partake of reciprocal axial movement to drive a tool bit, and cam follower means adapted to run in said cam track to impart said reciprocal axial motion to said output shaft, and wherein the tool is substantially sealed against ingress of moisture, liquid or the like to the drive means.

It is particularly advantageous in providing a sealed power tool to use such a motor-and-cam arrangement, which provides a reciprocating motion which may be used to drive a tool bit, and which may be run at a relatively low power thereby removing the necessity to provide ventilation or cooling for the power tool. Thus, a power tool in accordance with the present invention may be used in damp or otherwise hazardous environments, such as underwater.

Preferably the housing is sealed by means of an elastomeric lining. In one embodiment, elastomeric blocks are moulded to provide a housing within which the components of the tool may be located, and the entire assembly then sealed, for example by means of adhesive, and mounted within a housing of plastics material. Alternatively, the housing may be lined with an elastomeric membrane. Preferably at least a location of entry of the output shaft into the housing of a tool is sealed by means of an elastomeric diaphragm, thereby providing sufficient freedom of movement for the reciprocating motor of the tool bit. In one embodiment, the diaphragm may be moulded in a single piece with elastomeric blocks which contain a remainder of the power tool components.

In certain embodiments, the power tool may be powered by an external electrical supply. In these embodiments a power cable may enter the housing of the tool from the external supply. Preferably at least a section of the cable within the housing is "potted" in an elastomeric compound.

In an alternative embodiment, the tool may be powered by batteries. If desired, the batteries may be of the rechargeable type or may be replaceable. In an example of the invention, batteries may be provided internally of the casing, and may be accessible by means of a removable portion of the casing.

It is preferred, however, in certain embodiments that the tool make use of an external power source. This may be mains electricity through a transformer; or via an external supply, for example, a boat battery or generator, or a car battery. In a preferred embodiment, the tool is provided in conjunction with a portable battery pack which may be, for example, worn by a diver while using the tool.

Preferably the power tool further comprises a tool bit. Conveniently the tool bit may be removable from the mounting arrangement, enabling one of a plurality of tool bits to be selected for a particular application. Preferably the mounting arrangement comprises a splined shaft which cooperates with a receiving portion of the/a selected tool bit. Preferably the tool bit is in the form of a scraper blade.

Preferably the tool comprises an activation switch. Preferably the switch is in the form of a trigger. Conveniently the tool is only actuated when the trigger is depressed. This provides a "dead man's handle", so ensuring that the tool is not liable to cause injury if it is accidentally dropped while in use, for example.

Preferably the tool is a marine growth remover.

Preferably the tool is designed to reciprocate at between around 2000 cycles per minute to around 14,000 cycles per minute.

These and other aspects of the present invention will now be described by way of example only and with reference to the accompanying figures, in which:

FIG. 3 shows an internal side cross-sectional view of the power tool of FIG. 1; and FIG. 4 shows a schematic illustration of a cam means as may be used in a power tool in accordance with an embodiment of the present invention.

Figure 1:
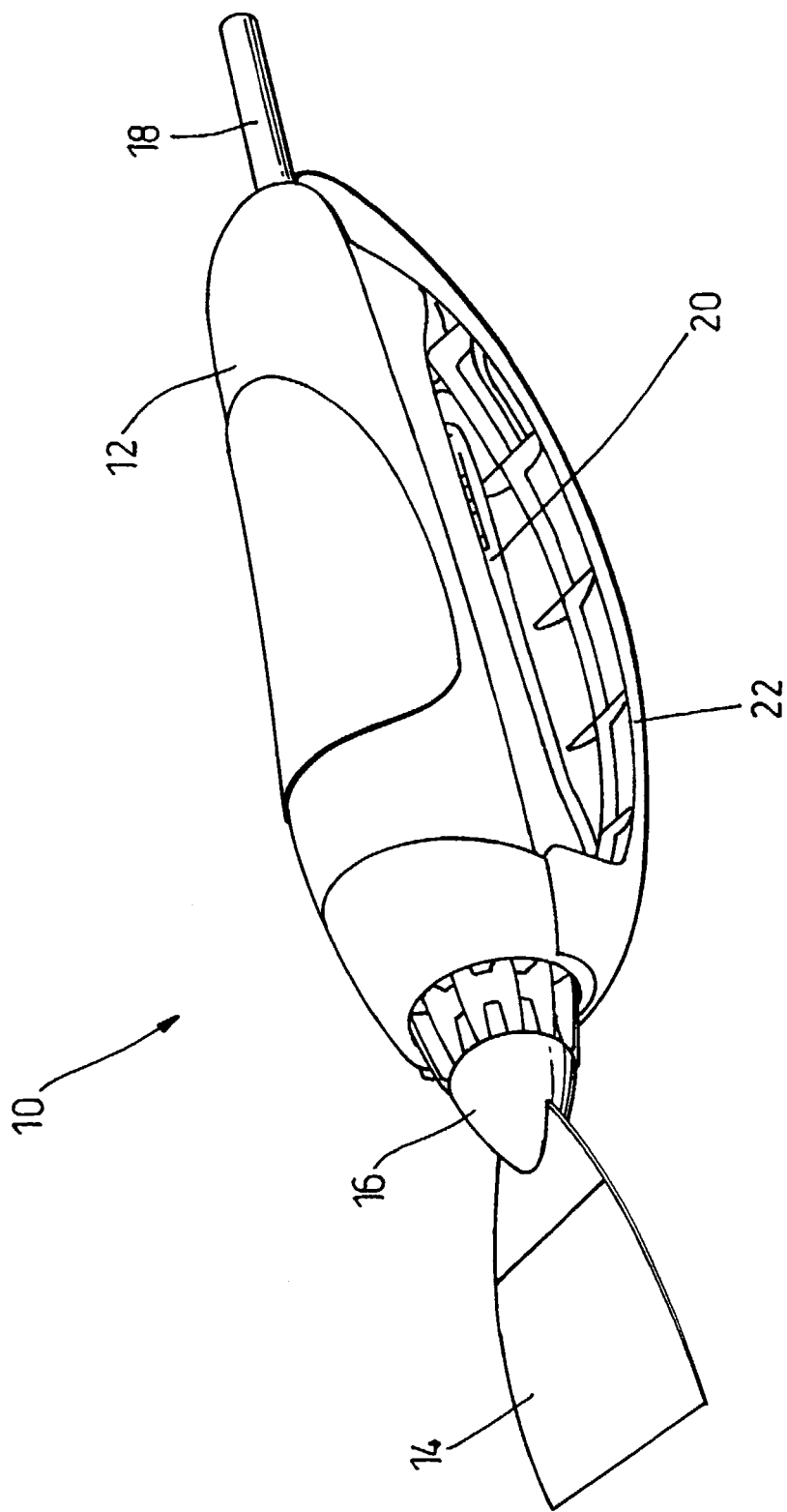
FIG. 1 shows an external view of a power tool in accordance with one embodiment of the present invention.

Referring first of all to FIG. 1, this shows an external view of a hand-held power tool, generally designated 10, in accordance with one embodiment of the present invention. The tool 10 includes a plastics casing 12 and a scraper blade 14. The blade 14 is mounted on a reciprocating shaft 16, which is powered by an internal motor (described below). One end of a power cable 18 enters the casing 12, while another end leads to a power supply (not shown); for example, a battery located on a boat. The casing 12 also includes an activating trigger mechanism 20, which provides a "dead man's handle" safety feature, and a hand guard 22, located so as to protect a user's fingers when holding the tool 10.

Figure 2:
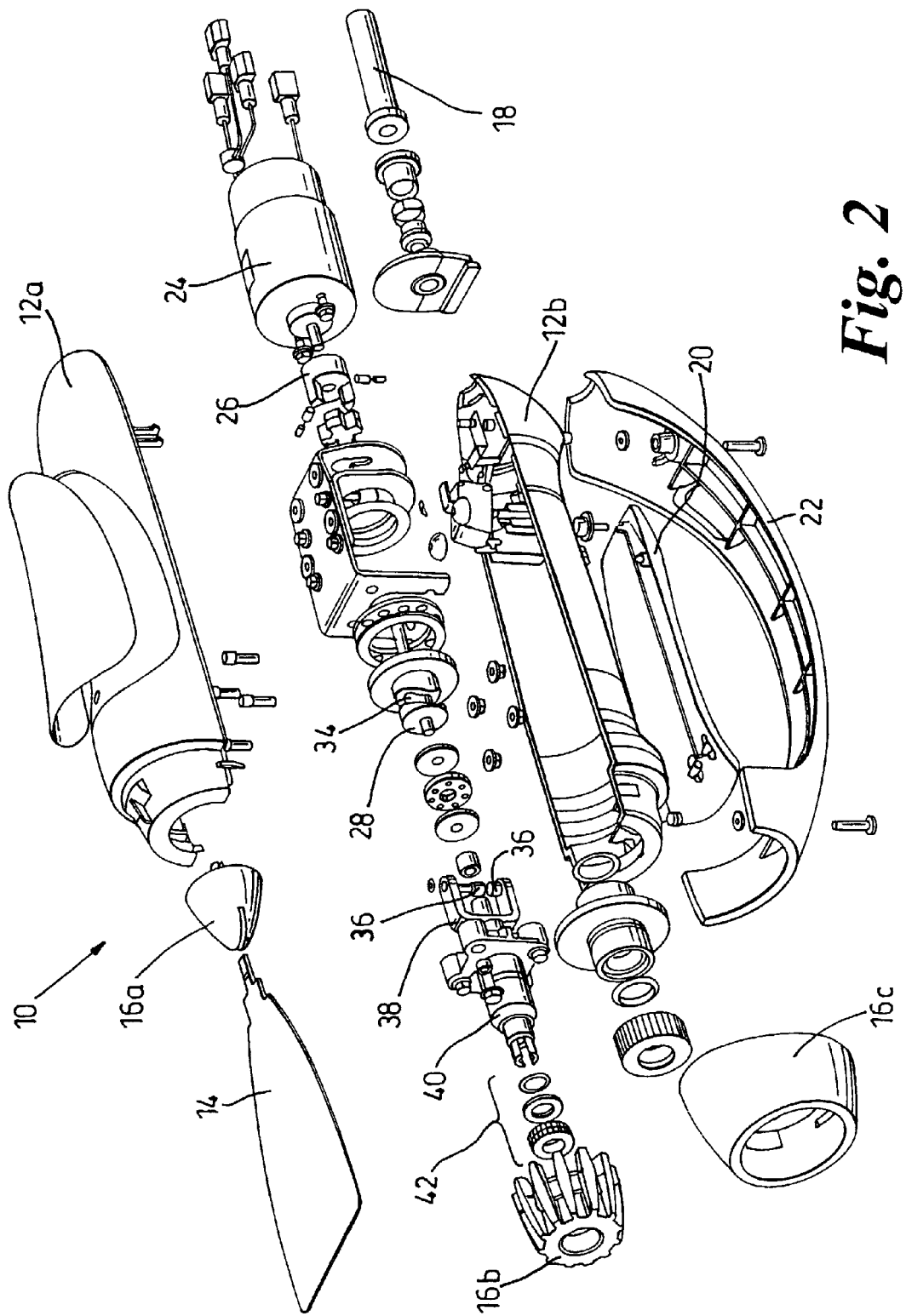
FIG. 2 shows an exploded view of the power tool of FIG. 1.

Internal components of the tool 10 are shown in an exploded view (FIG. 2) and in cross-sectional view (FIG. 3). Like parts are denoted with like numerals.

The power cable 18 leads to a low power rotary motor 24, which drives a rotatable output shaft 26. The motor 24 is "low power" in the sense that a typical motor as used in the present invention may run at 12-24V on 2-4 A, as opposed to conventional motors for existing reciprocating power tools, which may run at no less than a few hundred watts Mounted on the rotary output shaft 26 is a cylinder cam 28 with a circumferentially arranged substantially sinusoidal cam track 34. Received in the cam track 34 are a pair of studs 36, which are connected via a frame 38 to an output shaft 40. Mounted on the output shaft 40 are a number of retaining members 42 and a cover 16, which serve to secure the scraper blade 14 to the shaft 40. The cover 16 comprises a blade holder 16a, a collar 16b and a casing shroud 16c. In certain embodiments of the present invention, a plurality of interchangeable blades may be provided, in order to adapt the tool 10 for use in different applications.

The internal components of the tool 10 are substantially sealed from fluid ingress by a number of elastomeric components, shown in FIG. 3 only. A membrane 44 of elastomer forms a diaphragm adjacent the output shaft 40 and cover 16, which membrane 44 merges continuously with another membrane 46, surrounding internal components within the casing 12. The power cable 18 is potted within an elastomeric block 48 where it enters the tool casing 12. The membrane 44 is bonded to the interior of the retaining collar 16b in order to provide a watertight seal. The membrane 44 and potted block 48 are discontinuous, to provide entry points for the output shaft 40 and power cable 18, respectively. However, the elastomer is secured sufficiently tightly around the shaft 40 and cable 18 to provide watertight seals at these points.

The membrane 44 is flexible enough to enable reciprocating movement of the output shaft 40, while the membrane 44, other membrane 46, and block 48 together substantially seal the interior of the tool. Alternative sealing means will be apparent to those of skill in the art.

Finally, FIG. 4 shows a schematic representation of the reciprocating mechanism as may be used with a power tool 10 in accordance with the present invention. Electric rotary motor 24 drives rotary output shaft 26, which in turn rotates cam means 28, which bears sinusoidal cam track 34.

Studs 36 act as cam followers, and are driven in an axially reciprocating motion by the rotational motion of the cam 28, the studs 36 in turn being mounted in frame 38 which is itself connected to tool blade 14 via output shaft 40. The low powered rotary motor 24 is therefore capable of driving an axially reciprocating blade 14 at up to 14,000 cycles per minute with relatively little waste heat generated, compared to conventional reciprocal motors.

Thus, the present invention provides a tool which may be sealed from moisture or other hazardous environments, and therefore is suitable for use as a marine growth remover, among other applications, the drive means requiring no cooling by means of slots or vents in the housing.

The invention claimed is:

1. A portable hand-held power tool comprising: a housing defining an interior space, a drive means provided within the interior space, a tool bit comprising a scraper means, a mounting arrangement for the tool bit, an output arrangement from the drive means, and a tool output shaft, the output arrangement being adapted to be driven, in use, by the drive means so as to drive the tool output shaft, the mounting arrangement, and the tool bit in a reciprocal axial motion, the tool further including an elastomeric lining and an elastomeric diaphragm formed of a single piece, the single piece being internal relative to the housing sealing the interior space against ingress of liquid or moisture, the elastomeric diaphragm sealing a location of entry of the tool output shaft relative to the interior space and the elastomeric lining surrounding internal components positioned within the interior space.

2. The tool of claim 1, wherein the output arrangement and the output shaft are connected together, and the output shaft and tool bit are secured together by the mounting arrangement.

3. The tool of claim 2, wherein the drive means, tool bit, mounting arrangement and output arrangement share a common longitudinal axis.

4. The tool of claim 1, wherein the tool comprises a marine growth removal tool.

5. The tool of claim 1, wherein the mounting arrangement is adapted to provide for selection of one of a plurality of interchangeable tool bits.

6. The tool of claim 1, wherein the drive means is a linear output motor.

7. The tool of claim 1, wherein the drive means is a rotary motor requiring the output arrangement to convert rotary motion of an output shaft of the rotary motor into axially reciprocating motion of the tool output shaft.

8. The tool of claim 7, further comprising a cylinder cam mounted for rotation with the output shaft of the rotary motor, said cam being provided with a cam track extending around its circumferential surface, an output shaft adapted to be driven in reciprocal axial movement to drive a selected tool bit, and cam follower means adapted to run in said cam track to impart said reciprocal axial motion to said output shaft.

9. The tool of claim 8, wherein the cylinder cam is one of a plurality of cam members having a range of cam throw distances.

10. The tool of claim 8, wherein the cam track is substantially sinusoidal.

11. The tool of claim 1, wherein the drive means is an electrically powered drive means.

12. The tool of claim 1, further comprising a hand-guard.

13. The tool of claim 1, wherein the drive means comprises a motor driven, in use, by an external electrical supply.

14. The tool of claim 1, wherein the drive means is driven, in use, by an external electrical supply comprising a 12 V to 24 V supply.

15. The tool of claim 1, wherein the tool is adapted to reciprocate at between around 2,000 cycles per minute to around 14,000 cycles per minute.

16. The tool of claim 1, wherein the tool is adapted for use in scraping a hull of a marine vessel.

17. The tool of claim 16, wherein the tool is adapted to be powered by an electrical power supply provided upon the marine vessel.

18. A hand-held power tool comprising a housing defining an interior space, a drive means provided within the interior space, a tool bit comprising a scraper blade, a mounting arrangement for the tool bit, an output arrangement provided within the housing and adapted to be driven by the drive means, the drive means comprising a rotary motor, the output arrangement comprising a cylinder cam mounted for rotation with the drive means, said cam being provided with a substantially sinusoidal cam track extending around its circumferential surface, a tool output shaft adapted to partake of a reciprocal axial motion to drive the tool bit, cam follower means adapted to run in said cam track to impart said reciprocal motion to said tool output shaft, the tool including an elastomeric lining and an elastomeric diaphragm having a unitary structure and internal relative to the housing sealing the interior space against ingress of moisture or liquid, said cam follower and cam track disposed within the elastomeric lining and diaphragm and sealed from an exterior environment, the elastomeric diaphragm sealing a location of entry of the tool output shaft relative to the interior space and the elastomeric lining surrounding internal components positioned within the interior space.

19. The tool of claim 18, wherein the tool is powered by an external electrical supply.

20. The tool of claim 19, wherein a power cable enters the housing of the tool from the external electrical supply, and at least a section of the power cable within the housing is potted in an elastomeric compound.

21. The tool of claim 19 further comprising a portable battery pack, said tool being adapted to be worn by a diver while using the tool.

22. The tool of claim 18, wherein the tool bit is removable from the mounting arrangement, enabling one of a plurality of tool bits to be selected for a particular application.

23. The tool of claim 18, wherein the mounting arrangement comprises a splined shaft which cooperates with a receiving portion of a selected tool bit.

24. The tool of claim 18, further comprising an activation switch.

25. The tool of claim 24, wherein the tool is only actuated, in use, when the switch is depressed.

26. The tool of claim 18, wherein the tool is a marine growth remover.

27. The tool of claim 18, wherein the tool is adapted to reciprocate at between around 2,000 cycles per minute to around 14,000 cycles per minute.

28. The tool of claim 18, wherein the drive means comprises an electrically powered drive means.

29. The tool of claim 28, wherein the drive means is driven, in use, by an external electrical power supply comprising a 12 V to 24 V supply.

30. A portable hand-held power tool comprising: a housing defining an interior space, a motor provided within the interior space, a tool bit comprising a scraper, a mounting arrangement for the tool bit, an output arrangement from the motor, and a tool output shaft, the output arrangement being adapted to be driven, in use, by the motor so as to drive the tool output shaft, the mounting arrangement, and the tool bit in a reciprocal axial motion, the tool further including an elastomeric lining and an elastomeric diaphragm internal relative to the housing sealing the interior space against ingress of liquid or moisture, the elastomeric diaphragm sealing a location of entry of the tool output shaft relative to the interior space and the elastomeric lining sealing the motor and internal components, the elastomeric lining having a portion directly contacting the internal components.

31. A portable hand-held power tool comprising: a housing defining an interior space, a motor provided within the interior space, a tool bit comprising a scraper, a mounting arrangement for the tool bit, an output arrangement from the motor, and a tool output shaft, the output arrangement being adapted to be driven, in use, by the motor so as to drive the tool output shaft, the mounting arrangement, and the tool bit in a reciprocal axial motion, the tool further including an elastomeric lining and an elastomeric diaphragm internal relative to the housing sealing the interior space against ingress of liquid or moisture, the elastomeric diaphragm sealing a location of entry of the tool output shaft relative to the interior space and the elastomeric lining sealing the motor and internal components, the elastomeric lining having a portion spaced from the housing.

* * * * *